(12) United States Patent
Ultsch

(10) Patent No.: US 9,284,441 B2
(45) Date of Patent: Mar. 15, 2016

(54) POLYMER COMPOSITIONS AND ARTICLES PREPARED FROM THE SAME

(75) Inventor: Stefan Ultsch, Staefa (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/343,584

(22) PCT Filed: Sep. 4, 2012

(86) PCT No.: PCT/US2012/053624
§ 371 (c)(1),
(2), (4) Date: Mar. 7, 2014

(87) PCT Pub. No.: WO2013/039739
PCT Pub. Date: Mar. 21, 2013

(65) Prior Publication Data
US 2014/0228504 A1  Aug. 14, 2014

Related U.S. Application Data

(60) Provisional application No. 61/531,640, filed on Sep. 7, 2011.

(51) Int. Cl.
*C08L 9/00* (2006.01)
*C08L 23/08* (2006.01)
*C08K 3/06* (2006.01)
*C08L 23/16* (2006.01)
*C08K 5/47* (2006.01)

(52) U.S. Cl.
CPC . *C08L 23/08* (2013.01); *C08L 9/00* (2013.01); *C08L 23/0815* (2013.01); *C08L 23/16* (2013.01); *C08K 3/06* (2013.01); *C08K 5/47* (2013.01)

(58) Field of Classification Search
CPC ........ C08K 3/06; C08K 5/47; C08L 23/0815; C08L 23/16

USPC .................................................. 524/518, 525
See application file for complete search history.

(56) References Cited

U.S. PATENT DOCUMENTS

| | | | | |
|---|---|---|---|---|
| 4,215,086 A | * | 7/1980 | Durakis et al. | 264/135 |
| 4,869,848 A | * | 9/1989 | Hasegawa et al. | 252/609 |
| 5,096,743 A | * | 3/1992 | Schoenbeck | 427/189 |
| 5,272,236 A | | 12/1993 | Lai et al. | |
| 5,278,272 A | | 1/1994 | Lai et al. | |
| 6,111,021 A | | 8/2000 | Nakahama et al. | |
| 2005/0067036 A1 | | 3/2005 | Hirai et al. | |
| 2013/0096263 A1 | * | 4/2013 | Voorheis et al. | 525/331.7 |

FOREIGN PATENT DOCUMENTS

| | | | |
|---|---|---|---|
| GB | 1043078 | * | 9/1966 |
| GB | 2361485 | | 10/2001 |
| JP | 2005036169 | | 2/2005 |
| WO | 2010/009024 | | 1/2010 |
| WO | 2011/079207 | | 6/2011 |
| WO | 2011/163176 | | 12/2011 |

OTHER PUBLICATIONS

Online machine translation of JP 2005-036169A; publication date: Feb. 2005.*
ASTM Designation: D1238-10, "Melt Flow Rates of Thermoplastics by Extrusion Plastometer," pp. 1-15 (ASTM International) Published Mar. 2010.*
International Search Report and Written Opinion of the International Searching Authority for PCT/US2012/053624, mail date Feb. 8, 2013, 10 pages.
International Preliiminary Report on Patenability for PCT/US2012/053624, issue date Mar. 12, 2014, 7 pages.

* cited by examiner

*Primary Examiner* — Fred M Teskin

(57) ABSTRACT

The invention provides a composition comprising the following: A) an ethylene/α-olefin/diene interpolymer; B) from 40 to 70 weight percent, based on sum weight of A and B, of an ethylene/α-olefin copolymer; and C) a sulfur-containing compound.

17 Claims, 2 Drawing Sheets

POLYMER COMPOSITIONS AND ARTICLES PREPARED FROM THE SAME

REFERNECE TO RELATED APPLICATIONS

The present application claims the benefit of U.S. Provisional Application No. 61/531,640, filed on Sep. 7, 2011, incorporated herein by reference.

BACKGROUND OF THE INVENTION

The complicated jointing or sealing of cured EPDM is the major disadvantage for EPDM in numerous applications, such as, roofing and waterproofing applications, because EPDM is difficult to weld, and is therefore complicate and expensive to install.

There is a need for EPDM compositions that have good thermoplastic heat sealing characteristics. Such compositions should be processed and shaped on existing, state of the art processes and equipment; for example, using conventional compounding, extrusion, injection molding, calandering, and lamination equipment and processes.

International Publication No. WO 2010/009024 discloses cross-linked polymeric films, laminates, membranes or other polymeric articles, which show rubber like heat resistance (hot set) and dimensional stability above the polymer melting point, while maintaining heat sealing properties. For example, the invention provides a film comprising at least one layer formed from a composition comprising the following components: A) at least one polymer selected from the group consisting of the following: i) an ethylene-based polymer, ii) an ethylene/α-olefin/diene interpolymer, and ii) a C4-C10 olefin-based polymer; B) at least one polymer selected from the group consisting of a propylene/ethylene interpolymer and a propylene/alpha-olefin interpolymer; and wherein the film is crosslinked using radiation and/or chemicals.

International Publication No. WO 2011/079207 discloses compositions comprising an ethylene/alpha-olefin/polyene interpolymer, an ethylene/alpha-olefin copolymer, a filler, a cross-linking agent, and a blowing agent. These compositions can be used to form cross-linked foam and articles, such as automotive parts.

International Publication No. WO 2011/163176 discloses a crosslinked composition formed by thermally treating a composition comprising at least the following: A) an ethylene-based polymer that has a density less than, or equal to, 0.910 g/cc; B) an olefin-based polymer that has a melt viscosity less than, or equal to, 20,000 cP, at 350° F.; and C) a crosslinking agent.

There remains a need for crosslinked EPDM with the advantages of a thermoplastic polyethylene EPDM composition, which has good thermoplastic heat sealing characteristics. There is a further need for such compositions that can be processed and shaped on existing, state of the art processes and equipment. These needs and others have been met by the following invention.

SUMMARY OF THE INVENTION

The invention provides a composition comprising the following:
A) an ethylene/α-olefin/diene interpolymer;
B) from 40 to 70 weight percent, based on sum weight of A and B, of an ethylene/α-olefin copolymer; and
C) a sulfur-containing compound.

DETAILED DESCRIPTION OF THE INVENTION

Figure 1:
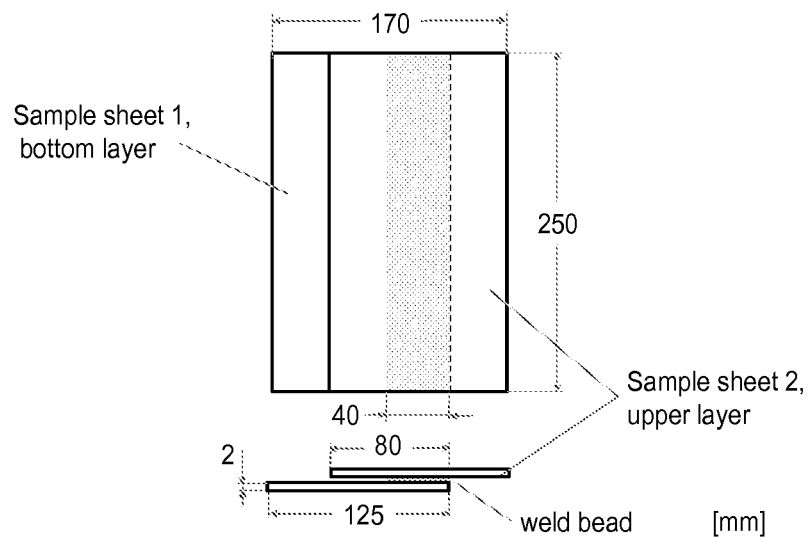
FIG. 1 is a schematic depicting a test sample for the welding test; the numerical dimensions, shown in this figure, are each in the unit of millimeter (mm).

It has been discovered that the use of an ethylene/α-olefin copolymer with an ethylene/α-olefin/diene interpolymer, in combination with sulfur cure, provides compositions with excellent heat welding properties and sufficient crosslinking. It has also been discovered that such compositions have excellent cold temperature performance. In addition, such compositions can incorporate large quantities of filler, and can be used on standard EPDM processing equipment, without change of equipment or processes.

As discussed above, the invention provides a composition comprising the following:
A) an ethylene/α-olefin/diene interpolymer;
B) from 40 to 70 weight percent, based on sum weight of A and B, of an ethylene/α-olefin copolymer; and
C) a sulfur-containing compound.

In one embodiment, the ethylene/α-olefin copolymer of Component B is present in an amount from 40 to 65 weight percent, based on sum weight of A and B.

In one embodiment, the ethylene/α-olefin copolymer of Component B is present in an amount from 40 to 60 weight percent, based on sum weight of A and B.

In one embodiment, the ethylene/α-olefin copolymer of Component B is present in an amount from 45 to 60 weight percent, based on sum weight of A and B.

In one embodiment, the ethylene/α-olefin copolymer of Component B is present in an amount from 50 to 60 weight percent, based on sum weight of A and B.

In one embodiment, the ethylene/α-olefin/diene interpolymer of Component A has a Mooney Viscosity [ML1+4, 125° C.] from 10 to 50.

In one embodiment, the ethylene/α-olefin/diene interpolymer of Component A has a Mooney Viscosity [ML1+4, 125° C.] from 20 to 30.

In one embodiment, the ethylene/α-olefin copolymer of Component B has a melt index (I2) from 2 to 40 g/10 min In one embodiment, the ethylene/α-olefin copolymer of Component B has a melt index (I2) from 2 to 20 g/10 min In one embodiment, the ethylene/α-olefin copolymer of Component B has a melt index (I2) from 4 to 20 g/10 min In one embodiment, the composition further comprises a flame retardant selected from the following: halogen-free flame retardant; brominated flame retardant. In a further embodiment, the flame retardant is present in an amount from 30 to 50 weight percent, based on the weight of the composition.

In one embodiment, the composition further comprises a flame retardant selected from the following: halogen-free flame retardant, such as, aluminum trihydrate and magnesium hydroxide. In a further embodiment, the flame retardant is present in an amount from 30 to 50 weight percent, based on the weight of the composition.

In one embodiment, Components A and B comprise at least 50 weight percent, based on the weight of the composition.

In one embodiment, Components A and B comprise at least 70 weight percent, based on the weight of the composition.

In one embodiment, Components A and B comprise at least 90 weight percent, based on the weight of the composition.

In one embodiment, the ethylene/α-olefin/diene interpolymer of Component A is present in an amount greater than 30 weight percent, based on the weight of the composition.

In one embodiment, the ethylene/α-olefin/diene interpolymer of Component A is present in an amount from 30 to 60 weight percent, based on the weight of the composition.

In one embodiment, the ethylene/α-olefin copolymer of component B is a homogeneously branched linear ethylene/α-olefin copolymer or a homogeneously branched substantially linear ethylene/α-olefin copolymer. In a further embodiment, the ethylene/α-olefin copolymer is a homogeneously branched substantially linear ethylene/α-olefin copolymer.

The invention also provides a crosslinked composition formed from an inventive composition.

In a preferred embodiment, the crosslinked composition comprises a two-phase structure of a sulfur-crosslinked ethylene/α-olefin/diene interpolymer matrix and a non-crosslinked, thermoplastic ethylene/α-olefin copolymer dispersed phase.

The invention also provides an article comprising at least one component formed from an inventive composition or crosslinked composition. In a further embodiment, the article is a roofing material.

An inventive composition may comprise a combination of two or more embodiments as described herein.

An inventive crosslinked composition may comprise a combination of two or more embodiments as described herein.

An inventive article may comprise a combination of two or more embodiments as described herein. In one embodiment, components A and B comprise at least 80 weight percent, preferably at least 90 weight percent, more preferably at least 95 weight percent, based on the weight of all the polymer components (organic polymeric components) of the composition.

In one embodiment, components A and B comprise less than, or equal to, 100 weight percent, preferably less than, or equal to, 99.5 weight percent, more preferably less than, or equal to, 99 weight percent, based on the weight of all the polymer components of the composition.

In one embodiment, the weight ratio of "component A/component B" is from 3/2 to 3/7 or from 3/2 to 2/3.

In one embodiment, the composition comprises at least one filler. In a further embodiment, the filler is selected from the group consisting of zinc oxide, carbon black, CaCO3, silica, and combinations thereof.

The ethylene/α-olefin/diene interpolymer (Component A) and the ethylene/α-olefin copolymer (Component B) of the inventive composition are not modified with one or more functional groups. For example, these polymers are not silane-grafted, maleic anhydride-grafted, nor TEMPO-grafted polymers. It is understood that some functionality may be incorporated into component A (preferably not into component B) after the inventive composition undergoes a crosslinking reaction.

An inventive composition may comprise a combination of two or more embodiments as described herein.

An inventive article may comprise a combination of two or more embodiments as described herein.

An inventive crosslinked composition may comprise a combination of two or more embodiments as described herein.

Ethylene/α-Olefin/Diene Interpolymers

The ethylene/α-olefin/diene interpolymers comprise, in polymerized form, ethylene, an α-olefin, and a diene. The diene may be conjugated or nonconjugated, and is preferably nonconjugated. Suitable examples of α-olefins include the C3-C10 α-olefins, and preferably propylene. Suitable examples of nonconjugated dienes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a preferred embodiment, the interpolymer is an ethylene/propylene/diene (EPDM) terpolymer. In a further embodiment, the diene is 5-ethylidene-2-norbornene (ENB).

In one embodiment, the diene is a nonconjugated diene. Illustrative nonconjugated dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/diene interpolymer is prepared in the presence of a single site catalyst, such as a constrained geometry catalyst (CGC), for example, a monocyclopentadienyl titanium complex; or other single site catalysts. Some examples of constrained geometry catalysts are described in U.S. Pat. Nos. 5,272,236 and 5,278,272. Some examples of other single site catalysts are described in U.S. Publication No. 2005/0164872, International Publication No. WO 2007/136494, and International Publication No. WO 2011/002998.

In one embodiment, the ethylene/α-olefin/diene interpolymer comprises a majority amount of polymerized ethylene, based on the weight of the interpolymer.

In one embodiment, the ethylene/α-olefin/diene interpolymer has a molecular weight distribution (Mw/Mn) from 1.5 to 5, preferably from 2 to 4.5 and more preferably from 2 to 4. All individual values and subranges from 1.5 to 5 are included herein and disclosed herein. In a further embodiment, the interpolymer is an EPDM. In a further embodiment, the diene is (ENB).

In one embodiment, the ethylene/α-olefin/diene interpolymer has a Mooney viscosity, ML(1+4) at 125° C., greater than, or equal to, 10, or greater than, or equal to, 15, or greater than, or equal to, 20. In a further embodiment, the interpolymer is an EPDM. In a further embodiment, the diene is (ENB).

In one embodiment, the ethylene/α-olefin/diene interpolymer has a Mooney viscosity, ML(1+4) at 125° C., less than 150, or less than, or equal to, 100, or less than, or equal to, 50. In a further embodiment, the interpolymer is an EPDM. In a further embodiment, the diene is (ENB).

Mooney viscosity is that of the neat interpolymer (or-calculated viscosity of neat polymer for polymers that contain a filler, such as carbon black, and/or an oil). The neat polymer refers to the polymer without filler and without oil.

An ethylene/α-olefin/diene interpolymer may comprise a combination of two or more embodiments as described herein.

An EPDM terpolymer may comprise a combination of two or more embodiments as described herein.

Ethylene/α-Olefin Copolymers

Suitable ethylene/α-olefin copolymers include heterogeneous linear ethylene/α-olefin copolymers, homogeneously branched linear ethylene/α-olefin copolymers, and homogeneously branched substantially linear ethylene/α-olefin copolymers; and preferably homogeneously branched linear ethylene/α-olefin copolymers, and homogeneously branched substantially linear ethylene/α-olefin copolymers; and more preferably homogeneously branched substantially linear ethylene/α-olefin copolymers. Respective polymers can be prepared with Ziegler-Natta catalysts, metallocene or vanadium-based single-site catalysts, or constrained geometry single-site catalysts, or other single site catalysts. Other single site catalysts are described in U.S. Publication No. 2005/0164872, International Publication No. WO 2007/136494, and International Publication No. WO 2011/002998.

Preferred α-olefins have from 3 to 18 carbon atoms, more preferably from 4 to 8 carbon atoms, and include propylene, 1-butene, 4-methyl-1-pentene, 1-hexene, and 1-octene, and preferably propylene, 1-butene, 1-hexene and 1-octene, and more preferably 1-butene, 1-hexene and 1-octene, and more preferably 1-butene and 1-octene.

In one embodiment, the ethylene/α-olefin copolymer has a melt index ($I_2$) less than, or equal to, 80 g/10 min, or less than, or equal to 60 g/10 min, or less than, or equal to 40 g/10 min, or less than, or equal to 20 g/10 min, as determined using ASTM D-1238-10 (190° C., 2.16 kg load). In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer has a melt index ($I_2$) greater than, or equal to, 2 g/10 min, or greater than, or equal to, 5 g/10 min, or greater than, or equal to 10 g/10 min, as determined using ASTM D-1238-04 (190° C., 2.16 kg load). In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer has a melt viscosity greater than, or equal to, 50,000 cP, further greater than, or equal to, 70,000 cP, further greater than, or equal to, 90,000 cP, at 350° F.

In one embodiment, the ethylene/α-olefin copolymer has a density less than, or equal to, 0.930 g/cm$^3$, or less than, or equal to, 0.920 g/cm$^3$, or less than, or equal to, 0.910 g/cm$^3$, or less than, or equal to, 0.890 g/cm$^3$. In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer has a density greater than, or equal to, 0.850 g/cm$^3$, or greater than, or equal to, 0.855 g/cm$^3$, or greater than, or equal to, 0.860 g/cm$^3$, or greater than, or equal to, 0.865 g/cm$^3$. In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer is a heterogeneous linear ethylene/α-olefin copolymer. Heterogeneous linear ethylene/α-olefin copolymers include linear low density polyethylene (LLDPE), ultra-low density polyethylene (ULDPE), and very low density polyethylene (VLDPE). In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer is a homogeneously branched linear ethylene/α-olefin copolymer or a homogeneously branched substantially linear ethylene/α-olefin copolymer. In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer is a homogeneously branched linear ethylene/α-olefin copolymer. In a further embodiment, the α-olefin is selected from propylene, 1-butene, 1-hexene or 1-octene, or from propylene, 1-butene, 1-hexene or 1-octene, or from 1-octene or 1-butene.

In one embodiment, the ethylene/α-olefin copolymer is a homogeneously branched substantially linear ethylene/α-olefin copolymer. In a further embodiment, the α-olefin is selected from propylene, 1-butene, 1-hexene or 1-octene, or from propylene, 1-butene, 1-hexene or 1-octene, or from 1-octene or 1-butene.

The terms "homogeneous" and "homogeneously-branched" are used in reference to an ethylene/α-olefin copolymer, in which the α-olefin comonomer is randomly distributed within a given polymer molecule, and all of the polymer molecules have the same or substantially the same comonomer/ethylene ratio. The homogeneously branched ethylene/α-olefin copolymers include homogeneously branched linear ethylene/α-olefin copolymers, and homogeneously branched substantially linear ethylene/α-olefin copolymers.

Included amongst the homogeneously branched linear ethylene/α-olefin copolymers are ethylene copolymers, which lack long chain branching (or measurable amounts of long chain branching), but do have short chain branches, derived from the comonomer polymerized into the copolymer, and which comonomer is homogeneously distributed, both within the same polymer chain, and between different polymer chains. That is, homogeneously branched linear ethylene/α-olefin copolymers lack long chain branching, just as is the case for the linear low density ethylene/α-olefin copolymers, and can be made using "uniform branching distribution" polymerization processes, as described, for example, by Elston in U.S. Patent 3,645,992. Commercial examples of homogeneously branched linear ethylene/α-olefin copolymers include TAFMER polymers supplied by the Mitsui Chemical Company, and EXACT polymers supplied by the ExxonMobil Chemical Company.

As discussed above, the homogeneously branched linear ethylene/α-olefin copolymers are described, for example, by Elston in U.S. Pat. No. 3,645,992, and subsequent processes to produce such polymers, using metallocene catalysts, have been developed, as shown, for example, in EP 0 129 368, EP 0 260 999, U.S. Pat. Nos. 4,701,432; 4,937,301; 4,935,397; 5,055,438; and WO 90/07526; each fully incorporated herein by reference.

The homogeneously branched substantially linear ethylene/α-olefin copolymers are described in, for example, U.S. Patent Nos. 5,272,236; 5,278,272; 6,054,544; 6,335,410 and 6,723,810; each fully incorporated herein by reference. The substantially linear ethylene/α-olefin copolymers are those in which the comonomer is randomly distributed within a given polymer molecule, and in which all of the polymer molecules have the same or substantially the same comonomer/ethylene ratio. In addition, the substantially linear ethylene/α-olefin copolymers have long chain branching (chain branch has more carbon atoms than a branched formed by the incorporation of one comonomer into the polymer backbone). The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. Polymers include the ENGAGE Polyolefin Elastomers available from The Dow Chemical Company.

In contrast to the homogeneously branched substantially linear ethylene/α-olefin copolymers, the homogeneously branched linear ethylene/α-olefin copolymers lack measurable or demonstrable long chain branches.

The homogeneously branched substantially linear ethylene/α-olefin copolymers form a unique class of homogeneously branched ethylene polymers. They differ substantially from the well-known class of conventional, homogeneously branched linear ethylene/α-olefin copolymers, described by Elston in U.S. Pat. No. 3,645,992, and, moreover, they are not in the same class as conventional heterogeneous, "Ziegler-Natta catalyst polymerized" linear ethylene/α-olefin copolymers (for example, LLDPE, ULDPE and VLDPE), made, for example, using the technique disclosed by Anderson et al., in U.S. Pat. No. 4,076, 698); nor are they in the same class as high pressure, free-radical initiated, highly branched polyethylenes, such as, for example, low density polyethylene (LDPE), ethylene-acrylic acid (EAA) copolymers, and ethylene vinyl acetate (EVA) copolymers.

The homogeneously branched, substantially linear ethylene/α-olefin copolymers have excellent processability, even though they have a relatively narrow molecular weight distribution. Surprisingly, the melt flow ratio ($I_{10}/I_2$), according to ASTM D 1238-10, of the substantially linear ethylene/α-olefin copolymers can be varied widely, and essentially independently of the molecular weight distribution ($M_w/M_n$ or MWD). This surprising behavior is completely contrary to conventional homogeneously branched linear ethylene/α-olefin copolymers, such as those described, for example, by Elston in U.S. Pat. No. 3,645,992, and heterogeneously branched "conventional Ziegler-Natta polymerized" linear ethylene/α-olefin copolymers, such as those described, for example, by Anderson et al., in U.S. Pat. No. 4,076,698. Unlike the substantially linear ethylene/α-olefin copolymers, linear ethylene/α-olefin copolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., 1989, C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B H and Stockmayer, W. H., J. Chem. Phys.,17,1301 (1949), and Rudin, A., Modern Methods of Polymer Characterization, John Wiley & Sons, New York (1991) pp. 103-112.

The homogeneous branched ethylene/α-olefin copolymers will preferably have a single melting peak, as measured using Differential Scanning calorimetry (DSC), in contrast to heterogeneously branched ethylene/α-olefin copolymers, which have two or more melting peaks, due to the heterogeneously branched polymer's broad short chain branching distribution.

In one embodiment, the ethylene/α-olefin copolymer has a molecular weight distribution ($M_w/M_n$) less than, or equal to, 5, preferably less than, or equal to, 4, and more preferably less than, or equal to, 3. In another embodiment, the ethylene/α-olefin copolymer has a molecular weight distribution ($M_w/M_n$) greater than, or equal to, 1.1, preferably greater than, or equal to, 1.2, and more preferably greater than, or equal to, 1.5. In a further embodiment, the α-olefin is selected from propylene, 1-butene, 1-hexene or 1-octene, or from propylene, 1-butene, 1-hexene or 1-octene, or from 1-octene or 1-butene.

An ethylene/α-olefin copolymer may comprise a combination of two or more embodiments as described herein.

Additives

An inventive composition may comprise one or more additives. Suitable additives include, but are not limited to, fillers, antioxidants, UV stabilizers, flame retardants, colorants, and combinations thereof.

In one embodiment, a composition further comprises at least one additive. In a further embodiment, the at least one additive is selected from the group consisting of fillers, flame retardants, colorants, stabilizers, processing aids, and combinations thereof.

In one embodiment, a composition further comprises a filler. In a further embodiment, the filler is selected from calcium carbonate, aluminum-trihydrate, magnesium-hydroxite, barium sulfate, talc or silica.

Crosslinking agents include, sulfur-containing compounds (Component C), such as elemental sulfur, 4,4'-dithiodimorpholine, thiuram di-and polysulfides, alkylphenol disulfides, and 2-morpholino-dithiobenzothiazole; Sulfur can be a crystalline elemental sulfur or an amorphous elemental sulfur, and either type can be in pure form or supported on an inert carrier. An example of a supported sulfur is RHENOGRAN S-80 (80% Sulfur content) from Rhein Chemie.

In one embodiment, the amount of the crosslinking agent ranges from about 0.5 to 10 parts by weight, based upon 100 parts of the polymers in the composition. Crosslinking temperatures and time employed are typical. Temperatures ranging from about 250° F. to about 440° F., and times ranging from about one minute to about 120 minutes can be employed.

Applications

The compositions of the present invention may be used to prepare a variety of articles or manufacture, or their component parts or portions. The inventive compositions are especially suited for roofing and water-proofing applications. The inventive compositions may be converted into a finished article of manufacture by any one of a number of conventional processes and apparatus. Illustrative processes include, but are not limited to, extrusion, calendering, compression molding, and other typical thermoset material forming processes. For example, articles can be prepared by extrusion, extrusion followed by additional thermal treatment, low pressure molding, compression molding, and the like.

Articles include, but are not limited to, foams, sheets, fibers, molded goods, and extruded parts. Additional articles include roofing materials, building material, automotive parts, weather strips, belts, hoses, wire and cable jacketing, flooring materials, gaskets, tires and tire components, computer parts, building materials, household appliances, electrical supply housings, trash cans, storage or packaging containers, lawn mower parts and other garden appliance parts, acoustic devices, utility cart parts, desk edging, toys and water craft parts. The compositions are well suited for roofing applications, such as roofing membranes. The compositions can further be used in fabricating a footwear component, including, but not limited to, a shaft for a boot, particularly an industrial work boot. The compositions can also be used in fabricating automotive parts. A skilled artisan can readily augment this list without undue experimentation.

Definitions

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the interpolymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term "ethylene/α-olefin copolymer," as used herein, refers to a polymer that comprises, in polymerized form, a majority weight percent of ethylene (based on the weight of the copolymer), an α-olefin, as the only two monomer types.

The term "phr," as used herein, is in reference to weight of a compositional component relative to "hundred parts" of the ethylene/α-olefin/diene interpolymer, and the ethylene/α-olefin copolymer.

The term "sulfur-containing compound, as used herein, refers to a chemical molecule that contains at least one sulfur atom (S).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability.

The term "consisting of" excludes any component, step or procedure not specifically delineated or listed.

Test Methods

Mooney Viscosity

Interpolymer MV (ML1+4 at 100° C.) is measured in accordance with ASTM 1646-04, with a one minute preheat time and a four minute rotor operation time. The instrument is an Alpha Technologies Rheometer MDR 2000.

Interpolymer MV (ML1+4 at 125° C.) is measured in accordance with ASTM 1646-04, with a one minute preheat time and a four minute rotor operation time. The instrument is an Alpha Technologies Rheometer MDR 2000.

Melt index (I2) of an ethylene-based polymer is measured in accordance with ASTM D-1238-04, condition 190° C./2.16 kg. Melt index (I5) of an ethylene-based polymer is measured in accordance with ASTM D-1238-10, condition 190° C./5.0 kg. Melt index (I10) of an ethylene-based polymer is measured in accordance with ASTM D-1238-10, condition 190° C./10.0 kg. High load melt index (I21) of an ethylene-based polymer is measured in accordance with ASTM D-1238-10, condition 190° C./21.0 kg.

Polymer density is measured in accordance with ASTM D-792-08.

Melt Viscosity

Melt viscosity was measured in accordance with ASTM D 3236 (350° F.), using a Brookfield Digital Viscometer (Model DV-II+, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermoset, and locked into place. The sample chamber has a notch on the bottom that fits the bottom of the Brookfield Thermoset, to ensure that the chamber is not allowed to turn when the spindle is inserted and spinning The sample (approximately 8-10 grams of resin) is heated to the required temperature, until the melted sample is about one inch below the top of the sample chamber. The viscometer apparatus is lowered and the spindle submerged into the sample chamber. Lowering is continued until the brackets on the viscometer align on the Thermoset. The viscometer is turned on, and set to operate at a shear rate which leads to a torque reading in the range of 40 to 60 percent of the total torque capacity, based on the RPM output of the viscometer. Readings are taken every minute for about 15 minutes, or until the values stabilize, at which point, a final reading is recorded.

Experimental

NORDEL IP 4725P Hydrocarbon Rubber (hereinafter referred to as NORDEL IP 4725P) is an ethylene/propylene/diene (ENB) that has a Mooney Viscosity from 21 to 29 (calculated for ML1+4 at 125° C., ASTM D1646), and contains a majority weight percent ethylene (polymerized).

ENGAGE 8137 Polyolefin Elastomer (hereinafter referred to as ENGAGE 8137) is an ethylene/octene-1 copolymer that has a density from 0.8610 to 0.8670 g/cc (ASTM D792; 1 cc=1 cm$^3$), and a melt index (I2) from 10 to 16 (ASTM D1238, 190° C., 2.16 kg).

RHENOGRAN S-80 (hereinafter referred to as "S-80") is 80% sulfur and 20% elastomer binder and dispersing agents, available from Rhein Chemie.

RHENOGRAN MBT-80 (hereinafter referred to as MBT-80) is 80% 2-mercapto-benzothiazol acc. to specification and 20% elastomer binder and dispersing agents, available from Rhein Chemie.

Zinc oxide was available from Sitar.

Stearic acid was available from Fluka Chemie AG.

RHENOGRAN TBzTD-70 (hereinafter referred as TBzTD) is tetrabenzyl-thiuramdisulfid, available from Rheinchemie.

Preparation of Unvulcanized Compositions Shown in Table 1

For each formulation shown in Table 1, the polymer components were first dry blended, and the additives were later added on the roll mill.

TABLE 1

Formulation phr (parts per hundred polymer base (NORDEL and ENGAGE))

| | Polymers | | Additives | | | | |
|---|---|---|---|---|---|---|---|
| | NORDEL IP | | | | | | |
| Sample # | 4725 P (EPDM) | ENGAGE 8137 (POE) | TBzTD | MBT-80 | S-80 | Stearic Acid | ZnO |
| 1 | 100.0 | 0.0 | 1.00 | 0.80 | 1.00 | 1.00 | 2.5 |
| 2 | 70.0 | 30.0 | 1.00 | 0.80 | 1.00 | 1.00 | 2.5 |
| 3 | 60.0 | 40.0 | 1.00 | 0.80 | 1.00 | 1.00 | 2.5 |
| 4 | 50.0 | 50.0 | 1.00 | 0.80 | 1.00 | 1.00 | 2.5 |
| 5 | 40.0 | 60.0 | 1.00 | 0.80 | 1.00 | 1.00 | 2.5 |
| 6 | 30.0 | 70.0 | 1.00 | 0.80 | 1.00 | 1.00 | 2.5 |

Preparation of Vulcanized (Cured) Test Samples

The compositions were compounded into unvulcanized sheets of about "3 mm" in thickness on a two-roll laboratory blender, in a first step, as described below. The roll mill temperature was set as shown below. First, the dry blended polymer were added to the roll mill, and mixed until a homogeneous bank (mixture) was achieved (approximately 60 seconds). Next, the additives were added to the bank, and mixing time was continued for an additional four minutes, and the final bank was pulled from the roll mill to form an unvulcanized sheet. The sheet was cooled to room temperature for about a 24 hour period, under ambient atmosphere.

Collin two-roll mill type W 150 MCollin W 150 M.
Roll size: 15 cm diameter, 30 cm width.
Material load per run: 300 g
Temperature setting: Front roll=105° C., back roll=100° C.
Roll speed: Front roll 4 rpm
Back roll 5 rpm
Roll gap: 1 mm
Total Compounding time: 5 minutes The unvulcanized sheets were then cut into pieces of about "60 mm by 60 mm by about 3 mm." A total load of about "150 g of the pieces of unvulcanized sheets" was placed in a "250 mm by 250 mm" metal frame of "2 mm thickness." The frame was inserted into a BÜRKLE hot press, and 250 mm by 250 mm by 2 mm sample sheets were shaped and vulcanized at a set-pressure of 50 bar, a press temperature of 180° C. over a time of 25 minutes.

Hot Set Testing

Samples were cut from the crosslinked plaques and subject to hot set testing. Hot set testing was done according to ISO 60811-2-1. Sample geometries and test conditions are listed in the Table 2. The hot elongation (%) was determined after five minutes exposure in the hot set oven. Cold elongation (%) was measured after ten minutes at ambient temperature.

TABLE 2

Hot Set Testing (ISO 60811-2-1)

| | | |
|---|---|---|
| Sample Thickness | 2 | mm |
| Sample width | 4 | mm |
| Cross-section | 8 | mm2 |
| Set temperature | 200 | deg C. |
| Load application time | 5 | min |
| Load Weight/Load | 0.2 | MPa |
| Weight/Load | 0.2 | MPa |
| Or | 160 | g |
| Marker Distance | 20 | mm |

Welding Property

For evaluation of the welding properties, two crosslinked test samples (250 mm×125 mm×2 mm) were cut from the plaques, as discussed above, and were heat welded with a Leister Triac-S heat welding system, as discussed below. The two samples were placed such that an overlap area of 80 mm×250 mm existed.

The surfaces of the two crosslinked test samples were pre-cleaned with acetone, air dried for at least five minutes, and heat welded using a "20 mm wide die nozzle," at a welder set temperature of 390° C., until a homogeneous weld bead was achieved. The weld area was 250 mm×40 mm, as shown in FIG. 1 (schematic showing weld area).

Figure 2:
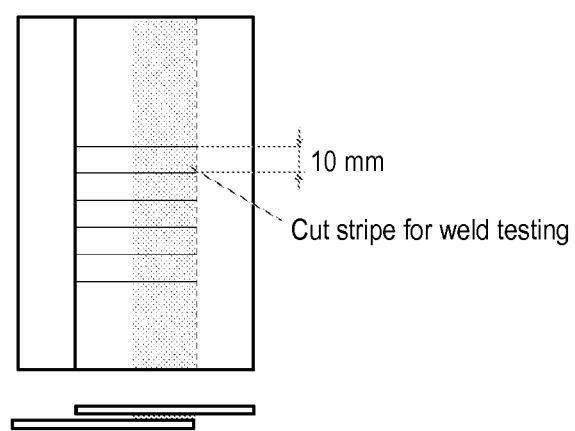
FIG. 2 is a schematic depicting sample strips to be cut from a welded test sample.

The welded sheets were stored at ambient conditions for 24 hour. Test samples of 10 mm (width) by 40 mm by 2 mm were cut in a rectangular angle over the welding seam (as shown in FIG. 2).

Figure 3:
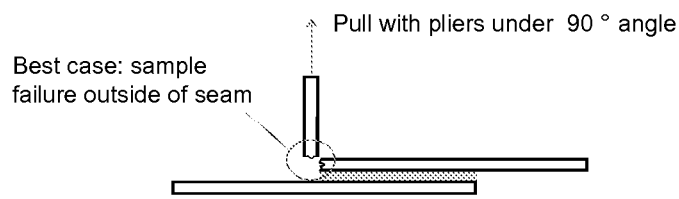
FIG. 3 is a schematic depicting a sample failure outside the weld seam ("break at seal").
Figure 4:
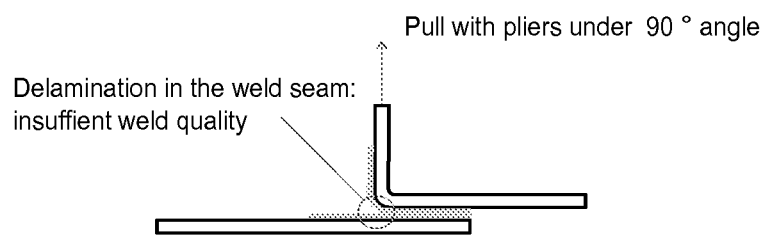
FIG. 4 is a schematic depicting a sample failure inside the weld seam ("peal in the seam").

Each test sample was hand-pulled using plyers, (for example, see FIG. 3). In total five pull tests were done per sample. Samples failed either outside the weld ("fracture of test sample" or "break at seal", see FIG. 3) or within the weld ("peeled in the seam", see FIG. 4) or Samples were rated satisfactory, as is common practice for building and construction applications, when failure of the samples occurred outside of the welded seam ("break at seal").

Summary of Results

The hot set and welding results are shown in Table 3. Sample 1 is a sulfur-curable formulation based on 100% EPDM, a reference according to common practice in the industry. This sample is highly crosslinked, as indicated by the hot set data, and there is no welding possible For sample 2 to 5, the EPDM of the sample 1 was systematically replaced with blends of EPDM with POE in a ratio from 70/30 to 30/70. Sample 2, with an addition of 30 phr POE, shows a high rate of hot set/crosslinking, but welding properties are not satisfactory. Welded seams fail in adhesive mode, that is, they peeled in the seam.

Samples 3-6 are formulations which illustrate the benefits of the invention. These samples had excellent welds, each of which failed by "break at seal."

In Samples 3-5, the sulfur-cured fraction of the EPDM provides a coherent and sufficient crosslinked network, indicated by the hot set. Sample 6 shows low crosslinking levels as indicated by the hot set (broke during this test), and represents the upper limit on the ethylene/α-olefin level. Samples 3-5 show higher crosslinking levels.

TABLE 3

Formulations in phr (parts per hundred of polymer base (NORDEL and ENGAGE))

| | Polymers | | Additives | | | | | Hot Set ISO 60811-2-1 (200 deg C., 0.2 Mpa) | | Welding (Hand-held Leister TRIAC hot air welder, 390 deg C., 25 mm nozzle) |
|---|---|---|---|---|---|---|---|---|---|---|
| Sample # | NORDEL IP 4725 P (EPDM) | ENGAGE 8137 (POE) | TBzTD | MBT-80 | S-80 | Stearic Acid | ZnO | Mean hot elongation [%] | Mean cold elongation [%] | Welding seam quality: failure mode |
| 1 | 100.0 | 0.0 | 1.00 | 0.80 | 1.00 | 1.00 | 2.5 | 24 | 6 | No welding possible |
| 2 | 70.0 | 30.0 | 1.00 | 0.80 | 1.00 | 1.00 | 2.5 | 57 | 17 | Adherent failure, peeling in the seam |
| 3 | 60.0 | 40.0 | 1.00 | 0.80 | 1.00 | 1.00 | 2.5 | 86 | 28 | Break of sample outside of weld seam |
| 4 | 50.0 | 50.0 | 1.00 | 0.80 | 1.00 | 1.00 | 2.5 | 153 | 41 | Break of sample outside of weld seam |
| 5 | 40.0 | 60.0 | 1.00 | 0.80 | 1.00 | 1.00 | 2.5 | 231 | 67 | Break of sample outside of weld seam |
| 6 | 30.0 | 70.0 | 1.00 | 0.80 | 1.00 | 1.00 | 2.5 | Break | Break | Break of sample outside of weld seam |

The invention claimed is:

1. A composition comprising the following:
A) an ethylene/α-olefin/diene interpolymer;
B) from 40 to 70 weight percent, based on sum weight of A and B, of an ethylene/α-olefin copolymer that has a density from 0.850 to 0.890 g/cm³; and
C) a sulfur-containing compound, and
wherein Components A and B comprises at least 50 weight percent, based on the weight of the composition, and
wherein the ethylene/α-olefin copolymer of Component B has a melt index (I2) from 4 to 40; and
wherein the ethylene/α-olefin/diene interpolymer of Component A has a Mooney Viscosity [ML1+4, 125° C.] from 10 to 50.

2. The composition of claim 1, wherein the ethylene/α-olefin copolymer of Component B is present in an amount from 40 to 60 weight percent, based on sum weight of A and B.

3. The composition of claim 1, further comprises a flame retardant selected from a halogen-free flame retardant, or a brominated flame retardant.

4. The composition of claim 3, wherein the flame retardant is present in an amount from 30 to 50 weight percent, based on the weight of the composition.

5. The composition of claim 1, wherein component A is present in an amount greater than 30 weight percent, based on the weight of the composition.

6. The composition of claim 1, wherein the ethylene/α-olefin copolymer is a homogeneously branched linear ethylene/α-olefin copolymer or a homogeneously branched substantially linear ethylene/α-olefin copolymer.

7. The composition of claim 6, wherein the ethylene/α-olefin copolymer is a homogeneously branched substantially linear ethylene/α-olefin copolymer.

8. A crosslinked composition formed from the composition of claim 1.

9. An article comprising at least one component formed from the composition of claim 1.

10. The article of claim 9, wherein the article is a waterproofing membrane.

11. The composition of claim 1, wherein Components A and B comprise at least 95 weight percent, based on the weight of the composition.

12. The composition of claim 1, wherein Components A and B comprise at least 90 weight percent, based on the weight of the composition.

13. A composition comprising the following:
A) an ethylene/α-olefin/diene interpolymer;
B) from 40 to 70 weight percent, based on sum weight of A and B, of an ethylene/α-olefin copolymer that has a density from 0.850 to 0.890 g/cm³; and
C) a sulfur-containing compound, and
wherein Components A and B comprise at least 70 weight percent, based on the weight of the composition; and
wherein the ethylene/α-olefin/diene interpolymer of Component A has a Mooney Viscosity [ML1+4, 125° C.] from 10 to 50.

14. A crosslinked composition formed from the composition of claim 13.

15. An article comprising at least one component formed from the composition of claim 13.

16. The article of claim 15, wherein the article is a waterproofing membrane.

17. The composition of claim 1, wherein the ethylene/α-olefin copolymer of Component B has a melt index from 10 to 20 g/10 min.

* * * * *